(12) United States Patent
Kim et al.

(10) Patent No.: US 11,501,885 B2
(45) Date of Patent: Nov. 15, 2022

(54) NUCLEAR FUEL PELLET HAVING ENHANCED THERMAL CONDUCTIVITY AND METHOD OF MANUFACTURING THE SAME

(71) Applicant: KOREA ATOMIC ENERGY RESEARCH INSTITUTE, Daejeon (KR)

(72) Inventors: Dong Seok Kim, Daejeon (KR); Dong-Joo Kim, Daejeon (KR); JangSoo Oh, Daejeon (KR); Keon-Sik Kim, Daejeon (KR); Jong-Hun Kim, Daejeon (KR); Jae-Ho Yang, Sejong-si (KR)

(73) Assignee: Korea Atomic Energy Research Institute, Daejeon (KR)

( * ) Notice: Subject to any disclaimer, the term of this patent is extended or adjusted under 35 U.S.C. 154(b) by 315 days.

(21) Appl. No.: 16/246,749

(22) Filed: Jan. 14, 2019

(65) Prior Publication Data

US 2020/0027602 A1    Jan. 23, 2020

(30) Foreign Application Priority Data

Feb. 13, 2018    (KR) .................. 10-2018-0017695
Jun. 8, 2018    (KR) .................. 10-2018-0066284

(51) Int. Cl.
*G21C 3/60*    (2006.01)
*G21C 3/04*    (2006.01)
(Continued)

(52) U.S. Cl.
CPC ............... *G21C 3/60* (2013.01); *G21C 3/048* (2019.01); *G21C 3/623* (2013.01); *G21C 21/02* (2013.01)

(58) Field of Classification Search
CPC ........... G21C 3/623; G21C 3/60; G21C 3/626
(Continued)

(56) References Cited

U.S. PATENT DOCUMENTS 3,121,128 A * 2/1964 O'Leary ............... G21C 3/623
376/901
3,752,872 A * 8/1973 Hill et al. ............. G21C 3/623
976/DIG. 96
(Continued)

FOREIGN PATENT DOCUMENTS

FR        3000594 A1    7/2014
JP        H1026684 A    1/1998
(Continued)

OTHER PUBLICATIONS

Durazzo, Michelangelo, and Humberto Gracher Riella. "Effect of mixed powder homogeneity on the UO2—Gd2O3 nuclear fuel sintering behavior." Key Engineering Materials. vol. 189. Trans Tech Publications Ltd, 2001. (Year: 2001).*
(Continued)

*Primary Examiner* — Jack W Keith
*Assistant Examiner* — Jinney Kil
(74) *Attorney, Agent, or Firm* — Don D. Cha; HDC Intellectual Property Law, LLP

(57) ABSTRACT

Disclosed are a nuclear fuel pellet having enhanced thermal conductivity and a method of manufacturing the same, the method including (a) a step of manufacturing a mixture including a nuclear fuel oxide powder and a thermally conductive plate-shaped metal powder; and (b) a step of molding and then heat-treating the thermally conductive plate-shaped metal powder to have an orientation in a horizontal direction in the mixture, thereby forming a pellet.

6 Claims, 3 Drawing Sheets

(51) Int. Cl.
*G21C 3/62* (2006.01)
*G21C 21/02* (2006.01)

(58) Field of Classification Search
USPC .......................................................... 376/419
See application file for complete search history.

(56) References Cited

U.S. PATENT DOCUMENTS

| | | | | |
|---|---|---|---|---|
| 4,505,882 | A | * | 3/1985 | Hasegawa ............ C01G 43/025 252/643 |
| 5,978,432 | A | * | 11/1999 | Kim .......................... C22C 1/04 376/261 |
| 2009/0252279 | A1 | | 10/2009 | Dorr et al. |
| 2012/0183116 | A1 | * | 7/2012 | Hollenbach ............ G21C 3/623 376/409 |

FOREIGN PATENT DOCUMENTS

| | | | |
|---|---|---|---|
| JP | 2003167084 A | | 6/2003 |
| KR | 20040047522 A | | 6/2004 |
| KR | 20150059893 A | * | 6/2015 |
| KR | 10-1638351 B1 | | 7/2016 |
| KR | 101652729 B1 | * | 9/2016 |
| KR | 101652729 B1 | | 9/2016 |

OTHER PUBLICATIONS

Kim, DS et al., "Aligning Mo Metal Strips in UO2 Fuel Pellets for Enhancing Radial Thermal Conductivity," 2017 Water Reactor Fuel Performance Meeting, Sep. 10 (Sun) ~ 14 (Thu), 2017.

* cited by examiner

NUCLEAR FUEL PELLET HAVING ENHANCED THERMAL CONDUCTIVITY AND METHOD OF MANUFACTURING THE SAME

CROSS-REFERENCE TO RELATED APPLICATION

This application claims priority to and the benefit of Korean Patent Application No. 10-2018-0017695, filed on Feb. 13, 2018 and Korean Patent Application No. 10-2018-0066284, filed on Jun. 8, 2018, the disclosure of which is incorporated herein by reference in its entirety.

BACKGROUND

1. Field of the Invention

The present disclosure relates to a nuclear fuel pellet having enhanced thermal conductivity and a method of manufacturing the same.

2. Discussion of Related Art

Nuclear power generation uses heat generated by nuclear fission. With regard to this, several tens to several hundred pellets made of nuclear fuel materials are packed into cladding tubes, both ends of each of the cladding tubes are sealed and welded to form fuel rods, and several tens to several hundred fuel rods are bundled to produce one assembly. Such fuel rod assemblies are loaded into a nuclear reactor, and heat generated in the pellets is transferred to cooling water flowing around the fuel rods through the cladding tubes via the nuclear fuel pellets.

Meanwhile, a cylindrical pellet manufactured by molding and sintering a material, which is made of an oxide of, for example, uranium (U), plutonium (Pu), or thorium (Th), or a combination thereof, is used as a nuclear fuel for nuclear power generation. Generally, uranium dioxide ($UO_2$) is mainly used as a material of the pellet. In some cases, nuclear fuel materials manufactured by adding one or more other fuel materials such as oxides of Pu and Th to $UO_2$ are used.

Meanwhile, $UO_2$, which is a typical nuclear fuel material, is widely used as a fuel material due to its high melting point and low reactivity with cooling water. However, $UO_2$ has a considerably low thermal conductivity of 2 to 5 W/mK in a used temperature range. With regard to this, since heat generated by nuclear fission is not quickly transferred to cooling water when the thermal conductivity of a nuclear fuel material is low, pellets have a much higher temperature than the cooling water.

The temperature of the center of a pellet is the highest, whereas a surface temperature thereof is the lowest. A difference between the center temperature of the pellet and the surface temperature thereof is inversely proportional to thermal conductivity. Accordingly, a center temperature of a pellet increases with decreasing thermal conductivity. A center temperature of a pellet is 1000 to 1500° C. in a normally burning nuclear fuel rod and may be higher than the melting temperature, 2800° C., of $UO_2$ in severe accidents.

In addition, since a nuclear fuel pellet has a high temperature and a large temperature gradient, all reactions, which depend on the temperature, are accelerated and thus the performance of materials deteriorates. In particular, performance deterioration becomes severe with an increasing combustion degree.

Further, when a nuclear fuel pellet is in a high temperature state, safety margins in many nuclear reactor accidents are decreased. For example, in the event of loss of cooling material, safety margins are decreased as the temperature of a nuclear fuel immediately before the accident is higher. In the event of a sudden increase in the output of a fuel rod, a center temperature of a pellet may be higher than the melting point of $UO_2$ due to low thermal conductivity of the pellet. A high output cannot be obtained when a significant restriction is applied to the output so as to prevent such problems, whereby economic losses occur.

Meanwhile, a method of adding a metal material having a high thermal conductivity to a pellet has been proposed as a typical method to address the problem of low thermal conductivity of an oxide nuclear fuel pellet as described above. However, this method has a limitation in that the content of heterogeneous materials that can be mixed in a pellet is limited due to economic problems such as reduction of a cycle length of nuclear fuel and, in the case of metal particles having a simple shape, a thermal conductivity improvement effect is very small compared to the content of the metal particles when the content of the metal particles is small.

RELATED ART DOCUMENTS

[Patent Document]
(Patent Document 0001) Korean Patent No. 10-1638351 (Jul. 12, 2016)

SUMMARY OF THE INVENTION

Therefore, the present disclosure has been made in view of the above problems, and it is an objective of the present disclosure to provide a method of manufacturing a nuclear fuel pellet having enhanced thermal conductivity, the method including (a) a step of manufacturing a mixture including a nuclear fuel oxide powder and a thermally conductive plate-shaped metal powder; and (b) a step of molding and then heat-treating the thermally conductive plate-shaped metal powder to have an orientation in a horizontal direction in the mixture, thereby forming a pellet.

It will be understood that technical problems of the present disclosure are not limited to the aforementioned problems and other technical problems not referred to herein will be clearly understood by those skilled in the art from disclosures below.

In accordance with the present disclosure, the above and other objectives can be accomplished by the provision of a method of manufacturing a nuclear fuel pellet having enhanced thermal conductivity, the method including (a) a step of manufacturing a mixture including a nuclear fuel oxide powder and a thermally conductive plate-shaped metal powder; and (b) a step of molding and then heat-treating the thermally conductive plate-shaped metal powder to have an orientation in a horizontal direction in the mixture, thereby forming a pellet.

In accordance with another aspect of the present disclosure, there is provided a nuclear fuel pellet having enhanced thermal conductivity including a nuclear fuel oxide matrix; and thermally conductive metal arrays dispersed to have an orientation in a horizontal direction in the matrix.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
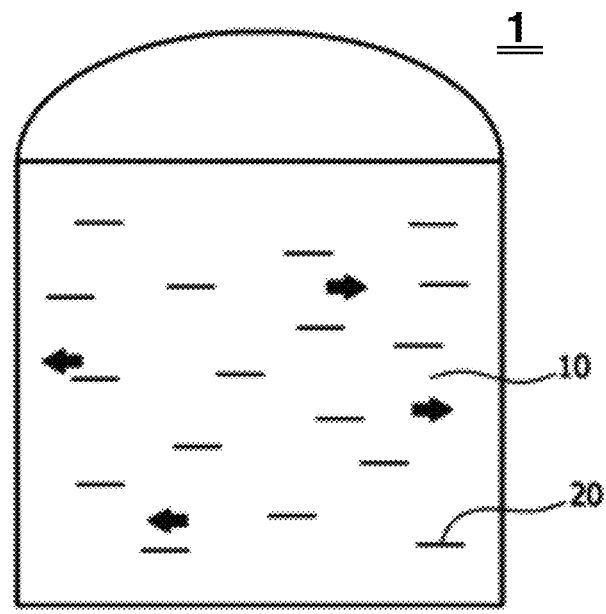
FIG. 1 schematically illustrates the structure of a nuclear fuel pellet having enhanced thermal conductivity according to an embodiment of the present disclosure.

The present inventors have researched to enhance thermal conductivity of a nuclear fuel pellet. As a result, the present inventors confirmed that a thermal conductivity enhancement effect can be maximized without deterioration of the structural integrity of a nuclear fuel pellet by adding a thermally conductive plate-shaped metal powder to a nuclear fuel oxide powder and mostly forming thermally conductive metal arrays in a horizontal direction (i.e., in a radial direction from the center) through molding and heat treatment, thus completing the present disclosure.

Now, the present disclosure will be described in detail.

Method of Manufacturing Nuclear Fuel Pellet Having Enhanced Thermal Conductivity The present disclosure provides a method of manufacturing a nuclear fuel pellet having enhanced thermal conductivity, the method including (a) a step of manufacturing a mixture including a nuclear fuel oxide powder and a thermally conductive plate-shaped metal powder; and (b) a step of molding and then heat-treating the thermally conductive plate-shaped metal powder to have an orientation in a horizontal direction in the mixture, thereby forming a pellet.

In the specification, "nuclear fuel oxide powder" is formed from a nuclear fuel oxide precursor, and refers to a state before a granulation process. In particular, the nuclear fuel oxide powder has an average particle size of 0.1 μm to 50 μm. A $UO_2$ powder may be formed from, without being limited to, a precursor, $UF_6$, in general production processes such as a dry process (DC) and a wet process (ADU, AUC).

In the specification, "plate-shaped, disc, or laminar" refers to a flat shape as opposed to a thin and elongated shape (acicular shape, needle) or a strip. A plate shape is characterized in that a ratio of average width to thickness is high and a constant area is observed in a top view.

In the specification, "horizontal direction" refers to a radial direction from the center of a nuclear fuel pellet and a direction in which thermal conduction of a nuclear fuel is mainly performed. In addition, "orientation", in the specification, refers to a distribution that is preferentially biased in a particular direction.

First, the method of manufacturing a nuclear fuel pellet having enhanced thermal conductivity according to the present disclosure includes a step of manufacturing a mixture including a nuclear fuel oxide powder and a thermally conductive plate-shaped metal powder [step (a)].

The nuclear fuel oxide powder may have an average particle size of 0.1 μm to 50 μm, particularly 0.1 μm to 30 μm, but the present disclosure is not limited thereto. In terms of a horizontal arrangement of the thermally conductive plate-shaped metal powder, an average particle size of the nuclear fuel oxide powder is preferably smaller than or equal to an average width or thickness (particularly, width) of a thermally conductive plate-shaped metal powder described below, but the present disclosure is not limited thereto.

On the other hand, nuclear fuel oxide granules are manufactured through a general granulation process using a nuclear fuel oxide powder as a raw material. An average particle size of nuclear fuel oxide granules is 100 μm or more, preferably 200 μm to 800 μm. Accordingly, a nuclear fuel pellet may be manufactured using nuclear fuel oxide granules instead of the nuclear fuel oxide powder. In this case, an additional procedure such as a powder granulation process is required and, when the properties of powder granules are not precisely controlled, the performance of a pellet may deteriorate. More particularly, a thermally conductive plate-shaped metal powder, described below, might not be uniformly dispersed in a nuclear fuel oxide matrix and is sensitive in that cracks may occur at interfaces between granules during a sintering process when process parameters are not appropriate. Accordingly, a general nuclear fuel manufacturing method should be modified, which indicates that the thermally conductive plate-shaped metal powder cannot be easily used in general processes.

In particular, the nuclear fuel oxide powder may include one or more selected from the group including uranium dioxide ($UO_2$), plutonium dioxide ($PuO_2$), and thorium dioxide ($ThO_2$), particularly uranium dioxide ($UO_2$), but the present disclosure is not limited thereto.

The thermally conductive plate-shaped metal powder is used as an additive for enhancing thermal conductivity of the nuclear fuel oxide pellet. The thermally conductive plate-shaped metal powder is characterized in that a ratio of average width to thickness is large unlike a spherical shape. Accordingly, the thermally conductive plate-shaped metal powder may continuously form thermally conductive metal arrays in a horizontal direction, which allows most of a nuclear fuel to be thermally conductive, by molding and heat treatment, whereby a thermal conductivity enhancement effect may be provided even using a small amount of the thermally conductive plate-shaped metal powder.

In particular, a ratio of average width to thickness of the thermally conductive plate-shaped metal powder is preferably 10 to 300, but the present disclosure is not limited thereto. When a ratio of average width to thickness of the plate-shaped metal powder is less than 10, the plate-shaped metal powder has a shape similar to a spherical shape, whereby thermally conductive metal arrays might not be continuously formed in a horizontal direction although molding and heat treatment are performed. When a ratio of average width to thickness of the thermally conductive plate-shaped metal powder is greater than 300, a thermal conductivity increase effect is insignificant, compared to an increase in a ratio of average width to thickness, and cracks may be generated in a nuclear fuel oxide matrix during a sintering process.

More particularly, the thermally conductive plate-shaped metal powder may have an average width of 1 μm to 900 μm and a thickness of 0.1 μm to 3 μm. In particular, the thermally conductive plate-shaped metal powder preferably has an average width of 5 μm to 900 μm and a thickness of 0.1 μm to 2 μm, but the present disclosure is not limited thereto. When an average width or thickness of the thermally conductive plate-shaped metal powder is too small, thermally conductive metal arrays might not be continuously formed in a horizontal direction although molding and heat treatment are performed. When an average width or thickness of the thermally conductive plate-shaped metal powder is too large, cracks may be generated in a nuclear fuel oxide matrix during a sintering process.

Figure 2:
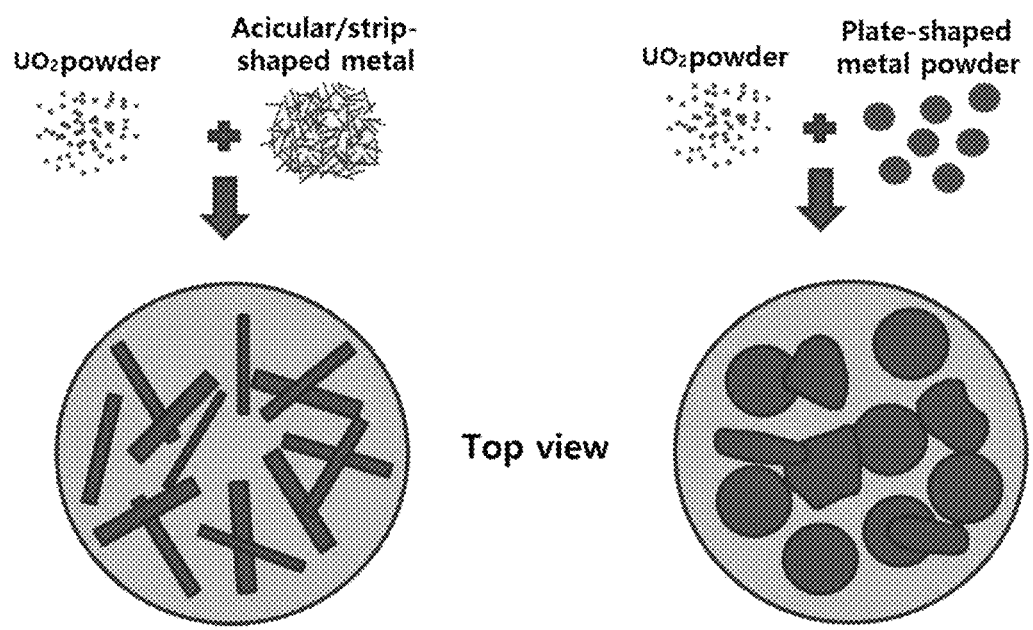
FIG. 2 schematically illustrates the characteristics of a thermally conductive plate-shaped metal powder included in a nuclear fuel pellet according to an embodiment of the present disclosure.

In addition, an average aspect ratio of planes of the thermally conductive metal powder granules is preferably 1 to 5, but the present disclosure is not limited thereto. When an average aspect ratio of planes of the thermally conductive plate-shaped metal powder granules is 5 or more, the thermally conductive plate-shaped metal powder granules have a shape similar to an acicular shape (needle) or a strip, whereby an effect of enhancing the thermal conductivity of a nuclear fuel pellet is decreased. FIG. 2 schematically illustrates the characteristics of a thermally conductive plate-shaped metal powder included in a nuclear fuel pellet according to an embodiment of the present disclosure.

When a metal powder having an acicular shape or a strip shape is added to improve the thermal conductivity of a nuclear fuel pellet, the metal powder having a thin and elongated shape may be arranged in a radial direction, which is a heat transfer direction from the center of a pellet to the outside, due to random arrangement thereof, or is arranged in another manner in many cases. Since particles not arranged in a heat transfer direction do not contribute to heat transfer, heat transfer efficiency is low, compared to the volume of a metal powder, in terms of heat transfer. However, in the case of the thermally conductive plate-shaped metal powder of the present disclosure, all particles thereof contribute to heat transfer, whereby thermal conductivity can be significantly enhanced.

In addition, the thermally conductive plate-shaped metal powder may include one or more selected from the group including molybdenum (Mo), chromium (Cr), tungsten (W), niobium (Nb), ruthenium (Ru), vanadium (V), hafnium (Hf), tantalum (Ta), rhodium (Rh) and zirconium (Zr), and may include an alloy based on the same.

In addition, the content of the thermally conductive plate-shaped metal powder based on the nuclear fuel oxide powder may be 1% by volume to 20% by volume, particularly 1% by volume to 5% by volume, but the present disclosure is not limited thereto. The thermally conductive plate-shaped metal powder may continuously form thermally conductive metal arrays in a horizontal direction, which allows most of a nuclear fuel to be thermally conductive, by molding and heat treatment, whereby a thermal conductivity enhancement effect may be provided even using a small amount of the thermally conductive plate-shaped metal powder.

In addition, the thermally conductive plate-shaped metal powder may be formed by milling a thermally conductive spherical metal powder. Here, the milling may be performed by a method known in the art.

Next, the method of manufacturing a nuclear fuel pellet having enhanced thermal conductivity according to the present disclosure includes a step of molding and then heat-treating the thermally conductive plate-shaped metal powder to have an orientation in a horizontal direction in the mixture, thereby forming a pellet [step (b)].

The molding may be performed such that the thermally conductive plate-shaped metal powder has an orientation in a horizontal direction, and is particularly performed by uniaxial pressing, but the present disclosure is not limited thereto. In particular, the molding may be performed at a pressure of 100 MPa to 500 MPa.

In addition, the heat treatment, which is performed to manufacture a nuclear fuel pellet, may be performed at 1300° C. to 1800° C. for 1 to 20 hours.

Selectively, the method of manufacturing a nuclear fuel pellet having enhanced thermal conductivity according to the present disclosure may further include a step of adding a combustible absorbent material to a nuclear fuel oxide powder of the step (a) or a step of coating the nuclear fuel pellet with a combustible absorbent material after the step (b).

To utilize the nuclear fuel pellet as a combustible absorbing rod for controlling surplus reactivity of a nuclear reactor core, the nuclear fuel pellet may include or may be coated with a combustible absorbent material.

The combustible absorbent material may include one or more selected from the group consisting of gadolinium (Gd), boron (B), erbium (Er) and dysprosium (Dy).

The content of the combustible absorbent material based on the nuclear fuel oxide powder may be 0.5% by weight to 20% by weight, particularly 5% by weight to 20% by weight, but the present disclosure is not limited thereto.

Nuclear Fuel Pellet Having Enhanced Thermal Conductivity

The present disclosure provides a nuclear fuel pellet with enhanced thermal conductivity including a nuclear fuel oxide matrix; and thermally conductive plate-shaped metal arrays dispersed to have an orientation in a horizontal direction in the matrix.

The nuclear fuel pellet having enhanced thermal conductivity according to the present disclosure includes a nuclear fuel oxide matrix; and thermally conductive plate-shaped metal arrays dispersed to have an orientation in a horizontal direction in the matrix.

FIG. 1 schematically illustrates the structure of a nuclear fuel pellet having enhanced thermal conductivity according to an embodiment of the present disclosure.

As shown in FIG. 1, a nuclear fuel pellet 1 according to an embodiment of the present disclosure having enhanced thermal conductivity includes a nuclear fuel oxide matrix 10; and thermally conductive plate-shaped metal arrays 20 dispersed to have an orientation in a horizontal direction in the matrix. Here, most of the thermally conductive plate-shaped metal arrays 20 are formed to have an orientation in a horizontal direction, thereby being capable of serving as efficient paths of heat transferred, in a horizontal direction, in the nuclear fuel pellet 1.

In particular, the nuclear fuel oxide matrix may include one or more selected from the group including uranium dioxide ($UO_2$), plutonium dioxide ($PuO_2$), and thorium dioxide ($ThO_2$). Here, a description of the nuclear fuel oxide matrix, which is formed from the nuclear fuel oxide powder, is the same as that of the nuclear fuel oxide powder.

In addition, the thermally conductive plate-shaped metal arrays may include one or more selected from the group including molybdenum (Mo), chromium (Cr), tungsten (W), niobium (Nb), ruthenium (Ru), vanadium (V), hafnium (Hf), tantalum (Ta), rhodium (Rh), and zirconium (Zr). In addition, the content of the thermally conductive plate-shaped metal arrays based on the nuclear fuel oxide matrix may be 1% by volume to 20% by volume, particularly 1% by volume to 5% by volume, but the present disclosure is not limited thereto. Here, deformation due to molding and heat treatment of the thermally conductive plate-shaped metal arrays, which are formed from the thermally conductive plate-shaped metal powder, is very insignificant. The thermally conductive plate-shaped metal arrays may have a ratio of average width to thickness of 10 to 300, an average width of 1 μm to 900 μm, and a thickness of 0.1 μm to 3 μm, as in the thermally conductive plate-shaped metal powder. In addition, an average aspect ratio of planes of the thermally conductive plate-shaped metal arrays is preferably 1 to 5, but the present disclosure is not limited thereto.

Selectively, a combustible absorbent material may be added to the nuclear fuel oxide matrix, or the nuclear fuel pellet may be coated with a combustible absorbent material.

The combustible absorbent material may include one or more selected from the group consisting of gadolinium (Gd), boron (B), erbium (Er) and dysprosium (Dy). In addition, the content of the combustible absorbent material based on the nuclear fuel oxide matrix may be 0.5% by weight to 20 by weight, particularly 5% by weight to 20% by weight, but the present disclosure is not limited thereto.

The nuclear fuel pellet having enhanced thermal conductivity according to the present disclosure may be manufactured according to the method.

In particular, the nuclear fuel oxide matrix may be manufacturing by molding and heat-treating a nuclear fuel oxide powder. In addition, the thermally conductive plate-shaped metal arrays, which are dispersed to have an orientation in a horizontal direction in the matrix, may be manufactured by molding and heat-treating the thermally conductive plate-shaped metal powder.

In addition, the present disclosure may provide a nuclear fuel including: the nuclear fuel pellet having enhanced thermal conductivity; and a nuclear fuel cladding tube in which a plurality of nuclear fuel pellets are loaded.

In addition, the present disclosure may provide a method of improving the thermal conductivity of a nuclear fuel pellet, the method including (a) a step of manufacturing a mixture including a nuclear fuel oxide powder and a thermally conductive plate-shaped metal powder; and (b) a step of molding and then heat-treating the thermally conductive plate-shaped metal powder to have an orientation in a horizontal direction in the mixture, thereby forming a pellet.

As described above, since the method of manufacturing a nuclear fuel pellet according to the present disclosure includes (a) a step of manufacturing a mixture including a nuclear fuel oxide powder and a thermally conductive plate-shaped metal powder; and (b) a step of molding and then heat-treating the thermally conductive plate-shaped metal powder to have an orientation in a horizontal direction in the mixture, thereby forming a pellet, the thermally conductive plate-shaped metal powder can mostly form thermally conductive metal arrays in a horizontal direction (i.e., in a radial direction from the center) by molding and heat treatment, and thus, a thermal conductivity enhancement effect can be provided even though the content of the thermally conductive plate-shaped metal powder is minimized.

In particular, when a ratio of average width to thickness of the thermally conductive plate-shaped metal powder is 10 to 300, sound microstructures can be formed, without generation of cracks in a nuclear fuel oxide matrix during a sintering process, while maximizing a thermal conductivity enhancement effect. Accordingly, the structural integrity of a nuclear fuel pellet is not deteriorated.

Accordingly, a nuclear fuel pellet manufactured according to the method can be easily applied to existing commercial nuclear fuel production facilities and can greatly improve nuclear fuel performance and safety under normal operation conditions and excessive conditions and in the case of an accident.

Further, to utilize the nuclear fuel pellet as a combustible absorbing rod for controlling surplus reactivity of a nuclear reactor core, the nuclear fuel pellet includes or is coated with a combustible absorbent material such as gadolinium (Gd), boron (B), erbium (Er), or dysprosium (Dy) with high neutron absorption capacity, which can effectively address the problem that the thermal conductivity of a nuclear fuel pellet is decreased in proportion to the content of the combustible absorbent material.

Now, the present disclosure will be described in more detail with reference to the following preferred examples. These examples are provided for illustrative purposes only and should not be construed as limiting the scope and spirit of the present disclosure.

EXAMPLE

Example 1

A $UO_2$ powder having an average particle size of about 0.3 μm was prepared as a nuclear fuel oxide powder. Meanwhile, a spherical Mo powder having an average particle size of about 3 μm was subjected to a milling process to prepare a Mo powder having a plate shape. The prepared plate-shaped Mo powder has an average width of about 5 μm and a thickness of about 0.3 μm.

Next, the prepared $UO_2$ powder was mixed with 5% by volume (based on the $UO_2$ powder) of the plate-shaped Mo powder to prepare a mixture.

Next, uniaxial press molding was performed at a pressure of about 300 MPa such that the plate-shaped Mo powder had an orientation in a horizontal direction in the prepared mixture, and then heat treatment was performed at about 1700° C. under a hydrogen atmosphere for 4 hours to manufacture a nuclear fuel pellet.

Example 2

A pellet was prepared in the same manner as in Example 1, except that a plate-shaped Mo powder with an average width of about 15 μm and a thickness of about 0.4 μm, prepared by milling a spherical Mo powder with an average particle size of about 5 μm, was used.

Example 3

A pellet was prepared in the same manner as in Example 1, except that a plate-shaped Mo powder with an average width of about 30 μm and a thickness of about 0.5 μm, prepared by milling a spherical Mo powder with an average particle size of about 10 μm, was used.

Example 4

A pellet was prepared in the same manner as in Example 3, except that 8% by weight (based on the $UO_2$ powder) of a $Gd_2O_3$ powder, as a combustible absorbent material, was additionally added and mixed with a $UO_2$ powder.

Comparative Example 1

A pellet was prepared in the same manner as in Example 1, except that a spherical Mo powder with an average particle size of about 3 μm was not subjected to a milling process.

Comparative Example 2

A pellet was prepared in the same manner as in Example 1, except that a Mo powder with an average width of about 1150 μm and a thickness of about 3 μm, prepared by milling a spherical Mo powder with an average particle size of about 300 μm, was used.

TABLE 1

|  | Average width | Thickness | Average width/thickness | Average aspect ratio |
|---|---|---|---|---|
| Example 1 | 5 μm | 0.3 μm | 16.7 | 1.5 |
| Example 2 | 15 μm | 0.4 μm | 37.5 | 1.4 |
| Example 3 | 30 μm | 0.5 μm | 60 | 1.3 |
| Example 4 | 30 μm | 0.5 μm | 60 | 1.3 |
| Comparative Example 1 | 3 μm | 3 μm | 1 | 1 |
| Comparative Example 2 | 1150 μm | 3 μm | 383.3 | 115 |

Figure 3:
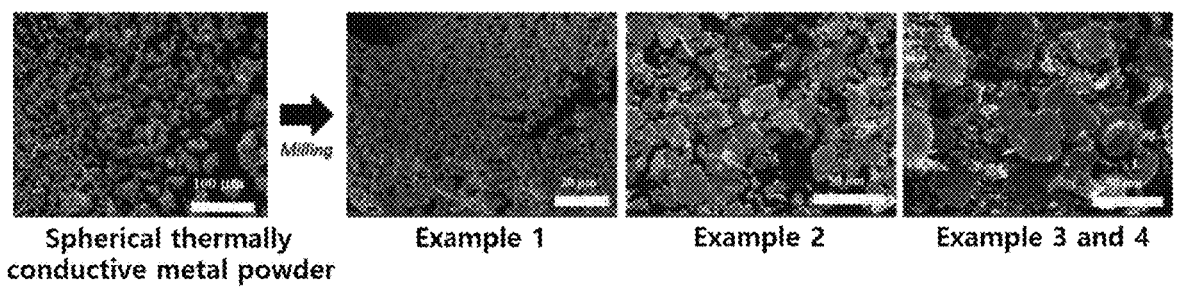
FIG. 3 illustrates scanning electron microscope (SEM) photographs of thermally conductive plate-shaped metal powders used to manufacture nuclear fuel pellets according to Examples 1 to 4.

FIG. 3 illustrates scanning electron microscope (SEM) photographs of thermally conductive plate-shaped metal powders used to manufacture nuclear fuel pellets according to Examples 1 to 4.

As shown in FIG. 3, the thermally conductive plate-shaped metal powders used in the methods of Examples 1 to 4, which are formed by milling thermally conductive spherical metal powders, were confirmed as having average widths of about 5 μm to about 30 μm. Meanwhile, the thermally conductive plate-shaped metal powders used in the nuclear fuel pellet manufacturing methods of Examples 1 to 4 were confirmed as having thicknesses of about 0.3 μm to about 0.5 μm, although not shown. Accordingly, when the thermally conductive plate-shaped metal powders used in the nuclear fuel pellet manufacturing methods according to Examples 1 to 4 had a ratio of average width to thickness of about 16.7 to about 60, the thermally conductive plate-shaped metal powders were molded to have an orientation in a horizontal direction in the nuclear fuel oxide mixtures, whereby a thermal conductivity enhancement effect were maximized.

Figure 4:
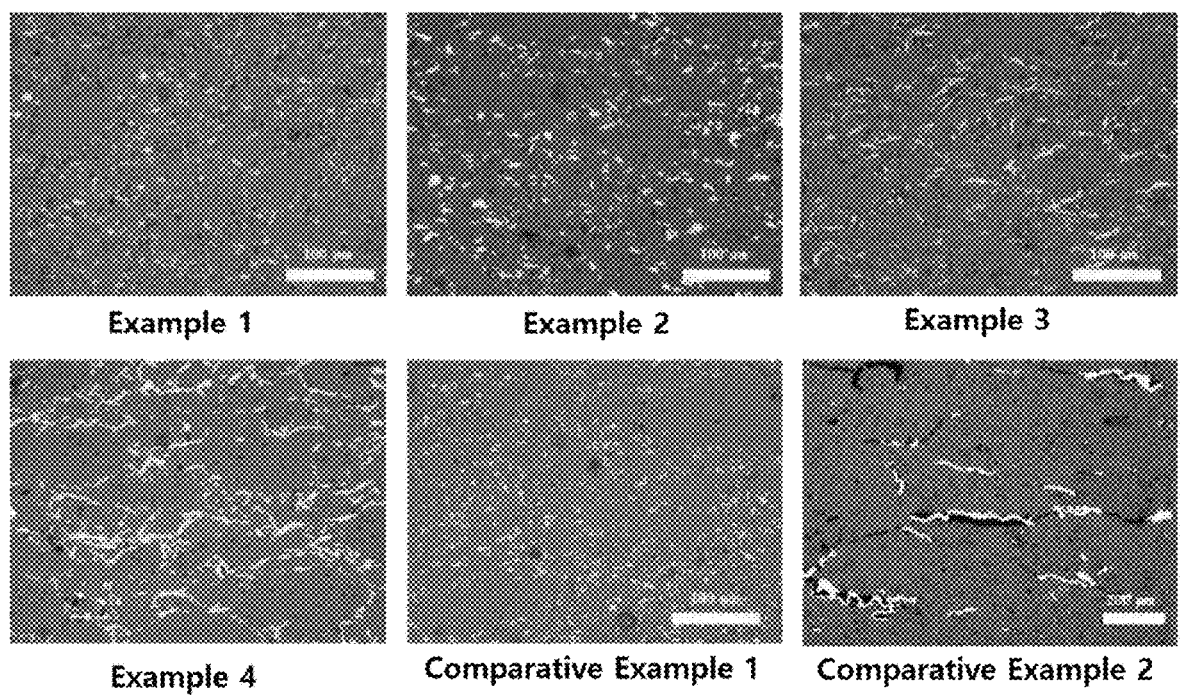
FIG. 4 illustrates optical microscope photographs of microstructures of nuclear fuel pellets according to Examples 1 to 4 and Comparative Examples 1 and 2.

FIG. 4 illustrates optical microscope photographs of microstructures of the nuclear fuel pellets according to Examples 1 to 4 and Comparative Examples 1 and 2.

As shown in FIG. 4, the nuclear fuel pellets according to Examples 1 to 4, which were manufactured using the thermally conductive plate-shaped metal powders (a ratio of average width to thickness was about 16.7 to about 60), were molded to have an orientation in a horizontal direction in the nuclear fuel oxide mixtures, thereby maximizing a thermal conductivity enhancement effect. In particular, it was confirmed that most of the thermally conductive plate-shaped metal powder could continuously form thermally conductive metal arrays in a horizontal direction through molding and heat treatment, and a sound nuclear fuel pellet, as in Examples 1 to 3, could be obtained also in the case in which $Gd_2O_3$ particles were included in the nuclear fuel pellet as in Example 4.

On the other hand, with regard to the nuclear fuel pellet according to Comparative Example 1 in which a thermally conductive spherical metal powder was used instead of a thermally conductive plate-shaped metal powder, the thermally conductive spherical metal powder did not exhibit an orientation and did not continuously form thermally conductive metal arrays although it was subjected to molding and heat treatment, and a thermal conductivity enhancement effect was insignificant. In addition, in the case of the nuclear fuel pellet according to Comparative Example 2, in which a thermally conductive plate-shaped metal powder wherein a ratio of average width to thickness=about 383.3 was used, the thermally conductive plate-shaped metal powder caused crack generation in a nuclear fuel oxide matrix during a sintering process. Therefore, the nuclear fuel pellets according to Comparative Examples 1 and 2 have functional and structural problems in application as a nuclear fuel pellet having enhanced thermal conductivity.

Figure 5:
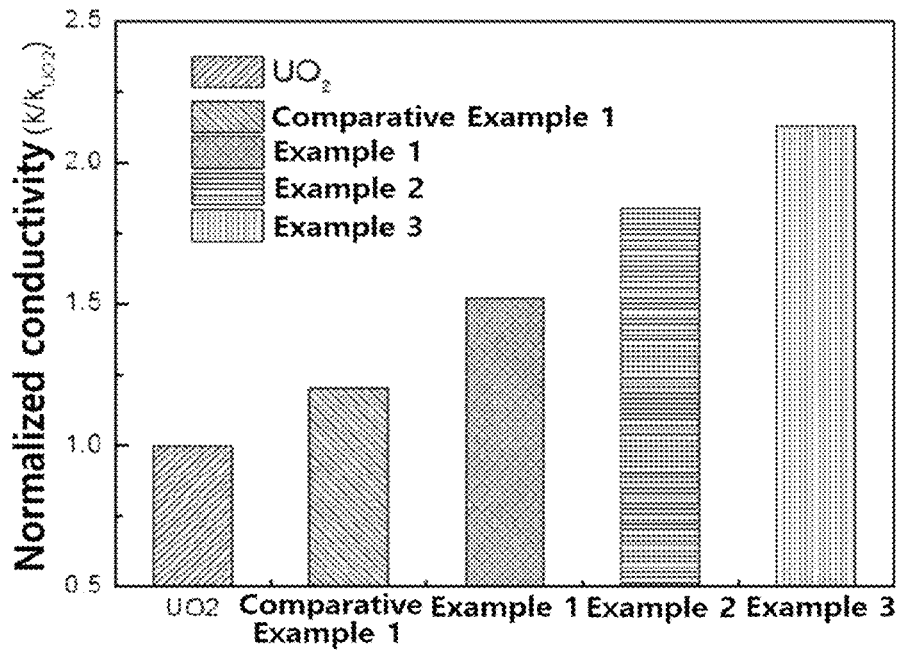
FIG. 5 is a graph illustrating normalized thermal conductivities of nuclear fuel pellets according to Examples 1 to 3 and Comparative Example 1.

FIG. 5 is a graph illustrating normalized thermal conductivities of the nuclear fuel pellets according to Examples 1 to 3 and Comparative Example 1.

From FIG. 5, it can be confirmed that an effect of enhancing the thermal conductivity of the nuclear fuel pellets according to Examples 1 to 3 is maximized with an increasing ratio of an average width to a thickness of the thermally conductive plate-shaped metal powder. On the other hand, it can be confirmed that, in the case of the nuclear fuel pellet according to Comparative Example 1 in which a thermally conductive spherical metal powder is used instead of a thermally conductive plate-shaped metal powder, a thermal conductivity enhancement effect is insignificant.

Figure 6:
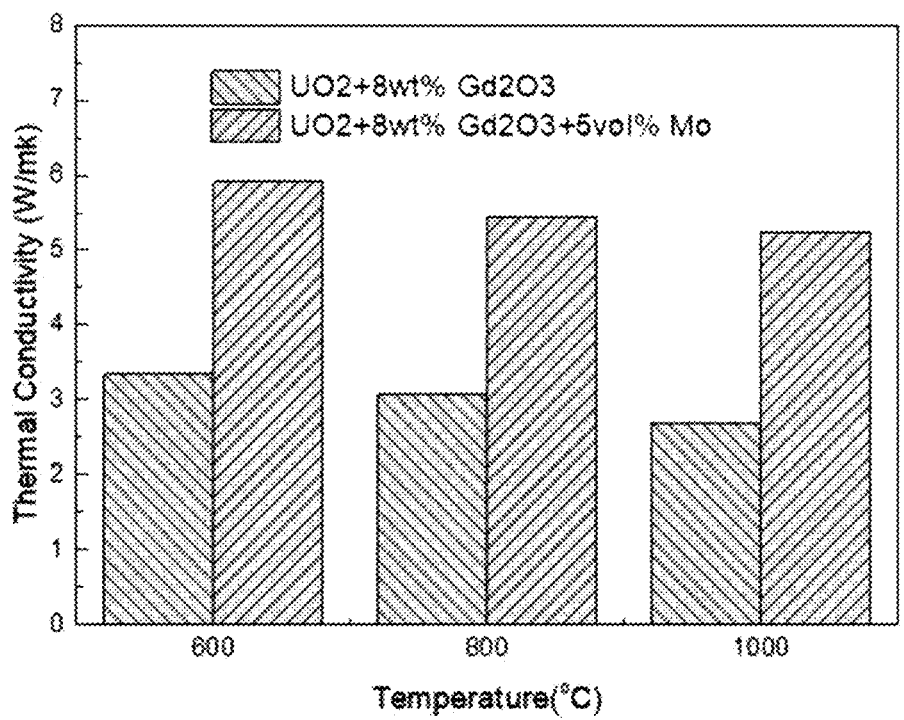
FIG. 6 is a graph illustrating thermal conductivity of a nuclear fuel pellet according to Example 4.

FIG. 6 is a graph illustrating the thermal conductivity of the nuclear fuel pellet according to Example 4.

From FIG. 6, it can be confirmed that, in the case of Example 4 in which $Gd_2O_3$ particles are included in a nuclear fuel pellet, a thermal conductivity enhancement effect is maximized.

As described above, since the method of manufacturing a nuclear fuel pellet according to the present disclosure includes (a) a step of manufacturing a mixture including a nuclear fuel oxide powder and a thermally conductive plate-shaped metal powder; and (b) a step of molding and then heat-treating the thermally conductive plate-shaped metal powder to have an orientation in a horizontal direction in the mixture, thereby forming a pellet, the thermally conductive plate-shaped metal powder can mostly form thermally conductive metal arrays in a horizontal direction (i.e., in a radial direction from the center) by molding and heat treatment, and thus, a thermal conductivity enhancement effect can be provided even though the content of the thermally conductive plate-shaped metal powder is minimized.

In particular, when a ratio of average width to thickness of the thermally conductive plate-shaped metal powder is 10 to 300, sound microstructures can be formed, without generation of cracks in a nuclear fuel oxide matrix during a sintering process, while maximizing a thermal conductivity enhancement effect. Accordingly, the structural integrity of a nuclear fuel pellet is not deteriorated.

Accordingly, a nuclear fuel pellet manufactured according to the method can be easily applied to existing commercial nuclear fuel production facilities and can greatly improve nuclear fuel performance and safety under normal operation conditions and excessive conditions and in the case of an accident.

Further, to utilize the nuclear fuel pellet as a combustible absorbing rod for controlling surplus reactivity of a nuclear reactor core, the nuclear fuel pellet includes or is coated with a combustible absorbent material such as gadolinium (Gd), boron (B), erbium (Er), or dysprosium (Dy) with high neutron absorption capacity, which can effectively address the problem that the thermal conductivity of a nuclear fuel pellet is decreased in proportion to the content of the combustible absorbent material.

The aforementioned description of the present disclosure is provided by way of example and those skilled in the art will understand that the present disclosure can be easily changed or modified into other specified forms without change or modification of the technical spirit or essential characteristics of the present disclosure. Therefore, it should be understood that the aforementioned examples are only provided by way of example and not provided to limit the present disclosure.

What is claimed is:

1. A nuclear fuel pellet having enhanced thermal conductivity, comprising:
   a nuclear fuel oxide matrix; and
   an array of thermally conductive plate-shaped metal powders dispersed to have an orientation in a horizontal direction for contributing to heat transfer in the nuclear fuel oxide matrix, wherein the nuclear fuel oxide matrix is formed from nuclear fuel powder, and wherein the thermally conductive plate-shaped metal powders have an average thickness of 0.3 µm to 0.5 µm.

2. The nuclear fuel pellet according to claim 1, wherein a ratio between average width to thickness of the thermally conductive plate-shaped metal powders is 10:300.

3. The nuclear fuel pellet according to claim 1, wherein the thermally conductive plate-shaped metal powders have an average width of 1 µm to 900 µm.

4. The nuclear fuel pellet according to claim 1, wherein the thermally conductive plate-shaped metal powders comprise one or more selected from the group comprising molybdenum (Mo), chromium (Cr), tungsten (W), niobium (Nb), ruthenium (Ru), vanadium (V), hafnium (Hf), tantalum (Ta), rhodium (Rh) and zirconium (Zr), and the content of the thermally conductive plate-shaped metal arrays based on 100% by volume of the nuclear fuel oxide matrix is 1% by volume to 20% by volume.

5. The nuclear fuel pellet according to claim 1, wherein a combustible absorbent material is added to the nuclear fuel oxide matrix, or the nuclear fuel pellet is coated with a combustible absorbent material.

6. The nuclear fuel pellet according to claim 5, wherein the combustible absorbent material comprises one or more selected from the group consisting of gadolinium (Gd), boron (B), erbium (Er), and dysprosium (Dy), and the content of the combustible absorbent material based on 100% by weight of the nuclear fuel oxide matrix is 0.5% by weight to 20% by weight.

* * * * *